Feb. 8, 1966  S. S. BROWN  3,233,448
WATER TESTER
Filed Dec. 21, 1962
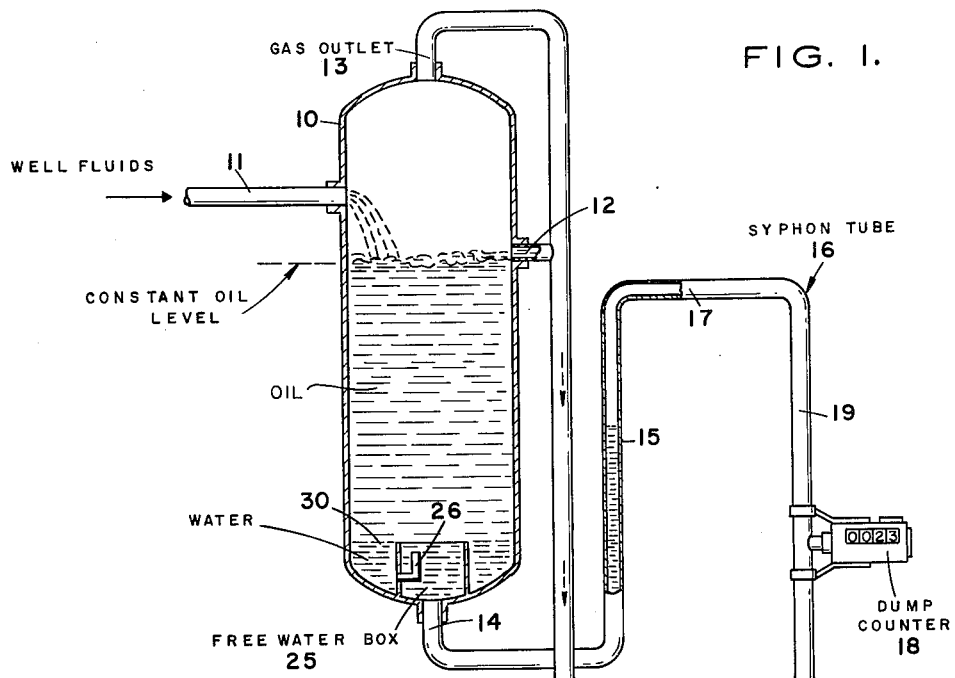
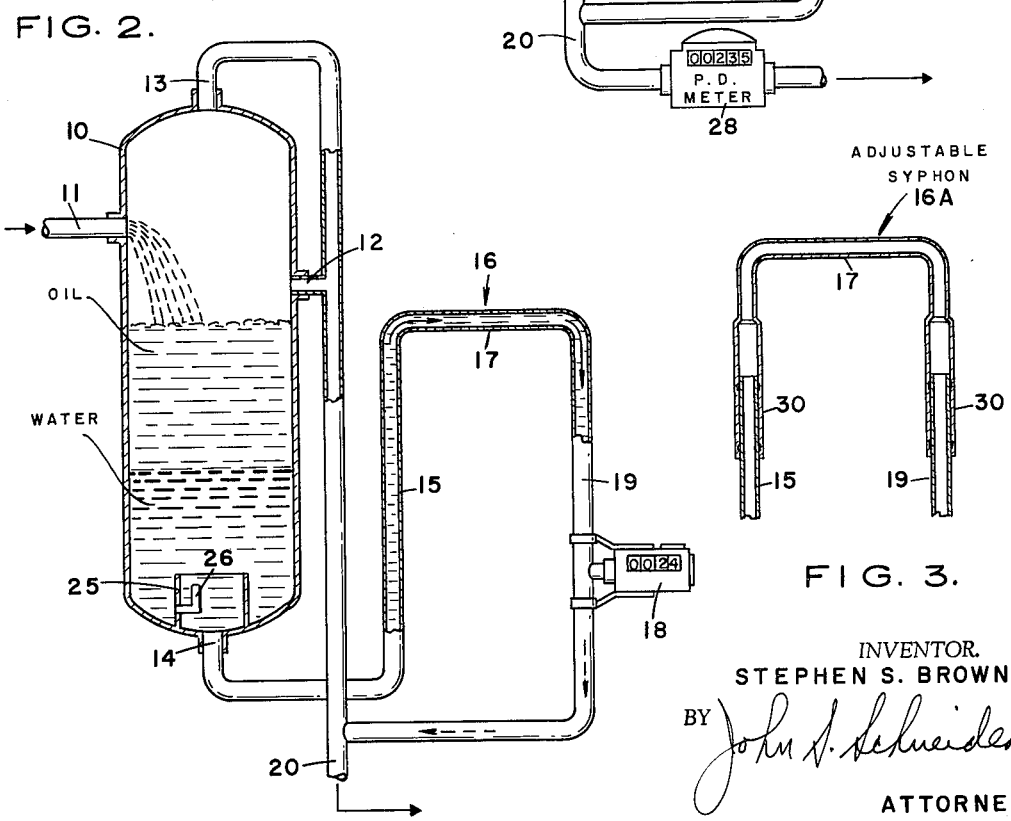
INVENTOR.
STEPHEN S. BROWN,
BY John S. Schneider
ATTORNEY.

United States Patent Office 3,233,448
Patented Feb. 8, 1966

1

3,233,448
WATER TESTER
Stephen S. Brown, La Porte, Tex., assignor, by mesne assignments, to Esso Production Research Company, Houston, Tex., a corporation of Delaware
Filed Dec. 21, 1962, Ser. No. 246,540
12 Claims. (Cl. 73—53)

This invention concerns apparatus for measuring the amount of one liquid contained in a flow stream mixture of two liquids, one of which is heavier than the other In particular, the invention concerns measuring the water content of an oil well flowing stream.

Briefly, the invention comprises a vessel for separating lighter and heavier liquids; a heavier and lighter liquids flow stream inlet conduit connected to said vessel; a lighter liquid discharge conduit connected to said vessel along the side thereof; a heavier liquid discharge conduit connected to the bottom of said vessel; a syphon tube having two legs of unequal length, the shorter leg being connected to said heavier liquid discharge conduit and the intermediate elevation between said legs being below the elevation of said lighter liquid discharge conduit; counter means arranged on the longer leg of said syphon tube adapted to register each time liquid flows through said longer leg; and means arranged on the bottom of said vessel adapted to retain some heavier liquid in said vessel for use in flushing lighter liquid from said shorter leg, whereby when the weight of said combined heavier and lighter liquids in said vessel reaches a predetermined amount which is sufficient to force liquid up the short leg of said syphon to the intermediate elevation between both legs of said syphon, the contents of said vessel except said retained liquid are discharged through said syphon tube. When this occurs, the counter is actuated and registers one dump of the vessel. Once the contents of the vessel have discharged, the syphon action will stop and liquids will again accumulate in the vessel. The volume of water contained in the vessel each time it empties is calculable from the size of the vessel and the elevation setting of the syphon. This elevation setting is made adjustable to facilitate changes in the weight or liquid head of the liquids in the vessel needed to cause the syphon to operate. As an example, at one height of the syphon tube, 70% by weight of the heavier liquid would cause the vessel to discharge; whereas, at a lower height of the syphon tube, 60% by weight of the heavier liquid would cause the syphon to be initiated. A meter for measuring the volume of oil or the volume of oil and water passing through the vessel is a desirable addition to the system.

The apparatus is particularly useful to measure the water content of oil well flowing streams, and to illustrate the invention this preferred use is described.

A gas discharge conduit may be provided at the top of the vessel. Also, baffles may be arranged within the vessel to give the liquids an opportunity to separate.

The invention is advantageous for it is a water tester that has no moving parts. The operation is entirely automatic and the equipment is inexpensive.

A primary object of the present invention is to provide an improved, automatic water tester, especially designed to measure the water content of an oil-water flowing stream. This object and other objects and advantages of the invention will be apparent from a more detailed description thereof when taken with the drawings wherein:

FIGS. 1 and 2 are schematic views of the apparatus in two different stages of operation; and FIG. 3 is a schematic view of a modified syphon tube.

As seen in FIGS. 1 and 2, a vessel 10 has connected to its upper end an inlet conduit 11 which feeds oil and mixtures of oil and water into vessel 10 where the oil and water separate. An oil discharge conduit 12 is connected to vessel 10 below inlet conduit 11. A gas discharge conduit 13 is attached to the upper end of vessel 10 and connects to oil discharge conduit 12 as shown. A water or water and oil discharge conduit 14 is connected to the bottom of vessel 10. The short leg 15 of a syphon tube 16 connects to discharge conduit 14. The intermediate elevation 17 of syphon tube 16 is positioned below the oil discharge conduit 12. A counter 18 is arranged on the long leg 19 of syphon tube 16. The lower end of the long leg 19 is connected to a discharge conduit 20. The combined flow of gas discharge conduit 13 and oil discharge conduit 12 also flow into discharge conduit 20. A free water box 25 is positioned in the bottom of vessel 10 adjacent discharge conduit 14. A small L-shaped tube 26 connects the interior of water box 25 to the exterior thereof. The uppermost end of tube 26 is below the uppermost edge of water box 25. A fluid meter unit 28, such as a positive displacement meter, is located in discharge line 20 downstream from the connection of the long syphon leg 19.

Operation of the water tester is illustrated in FIGS. 1 and 2. Referring to FIG. 1, oil well liquids flow into vessel 10 through inlet conduit 11. The vessel may be of a suitable size, e.g., 16 x 36 inches capable of handling 200 to 300 barrels of the liquid per day. Gases separated in vessel 10 exhaust through gas outlet 13 and pass downwardly through discharge conduit 20. Water and oil separate within vessel 10, and when the level of the oil reaches the height of oil discharge conduit 12, the oil passes through this conduit and also discharges through conduit 20 along with the gas. As water accumulates in the bottom vessel 10 and in shorter leg 15 of the syphon tube, weight of the liquids within the vessel 10, that is the effective head on the syphon, is increased by the amount of water collecting in the vessel as illustrated in FIG. 1. When the combined weight or head of the oil and water equals the height of the syphon, the syphon tube legs 15 and 19 fill and the syphon operates to discharge the entire measurable contents of vessel 10 to discharge conduit 20. The action of liquid flowing through conduit 19 trips counter 18 and registers a count, either mechanically, electrically, or pneumatically, as seen in FIG. 2. Once the contents of vessel 10 have discharged through syphon tube 16, the syphon action stops and the liquids again accumulate in vessel 10 and the fill-dump cycle of the liquids is repeated. The volume of water contained in vessel 10 each time it dumps is calculable from the size of the vessel and height 17 of the syphon tube. Applying this volume to the number of counts registered, the volume of water produced with the oil stream is determined.

A water level 30 is shown in vessel 10; however, it is not necessary for the water and oil to separate completely into separate phases. Water in an oil-water emulsion will increase the head of the liquids in the same manner as when the liquids stratify. The apparatus does not depend on the efficiency of oil-water breakout.

The only requirement as to free water is that sufficient water be available in the bottom of vessel 10 to assure that after being emptied, the short syphon leg 15 is refilled with water, not oil. Free water box 25 permits the retention of a sufficient volume of free water in the bottom of vessel 10 to fill short syphon leg 15 with water. As seen in FIG. 2, the water level is above the height of box 25. As liquid within vessel 10 passes through discharge conduit 14, the kinetic energy or velocity of the liquid acting on the top of tube 26 prevents the liquid surrounding box 25 from entering the box, which results in the water level surrounding the box remaining constant when the vessel is dumping. Oil, being lighter than water, is the last liquid to flow into syphon tube 15 when the vessel empties to the level of box 25. Since free water remains in the space surrounding and below the top of box 25 as oil stops flowing, water from this space will flow through L-shaped tube 26 into box 25 and flush any remaining oil out of syphon tube 15 and provide a water-filled leg. Meter 28 measures the total volume of the liquids passing through vessel 10. Since dump counter 18 indicates the water content of the liquid, the amount of oil in the liquid and the water-oil ratio of the liquid are readily ascertainable from the number of dumps registered by dump counter 18 and total amount of oil and water registered by meter 28.

An adjustable syphon is illustrated in FIG. 3. This syphon tube 16A is provided with telescopic sealed joints 30 on each leg 15 and 19 of the syphon in order to raise or lower the intermediate height 17 of the syphon tube. Other means for adjusting the height of the syphon such as swivel joints may be used instead.

Having fully described the nature, objects, apparatus, and advantages of the invention, I claim:

1. Apparatus for determining the amount of the heavier liquid in a flow stream containing both heavier and lighter separable liquids comprising a vessel having a flow stream inlet for said heavier and lighter liquids and a bottom discharge for all of the heavier liquid in said flow stream;
   a syphon attached to said bottom discharge, the intermediate elevation of which is at a selected height relative to a selected head of the liquids in said vessel at which it is desired to discharge said vessel through said syphon;
   means within said vessel adapted to retain an amount of said heavier liquid, separable from the flow stream liquids each time said vessel fills to fill the shorter leg of said syphon and adapted to release said retained heavier liquid to flush the shorter leg of said syphon and leave it free of lighter liquid following discharge of said liquids from said vessel;
   said selected head of the liquids being that sufficient to force the heavier liquid up the shorter leg of said syphon to the intermediate elevation between both legs of said syphon to discharge through said syphon tube the contents of said vessel except said retained heavier liquid; and
   a counter arranged on the longer leg of said syphon adapted to count each syphoning of said vessel whereby the number of syphonings, the size of said vessel, and the head of said separated heavier liquid when said syphoning beings permit determination of the amount of heavier liquid in said flow stream.

2. Apparatus as recited in claim 1 including means adapted to adjust the height of said syphon.

3. Apparatus as recited in claim 2 including means connected to said vessel adapted to discharge gas separated from said liquids in said vessel.

4. Apparatus as recited in claim 3 in which said vessel is also provided with an overflow discharge for lighter liquid which separates from the flow stream liquids.

5. Apparatus as recited in claim 4 including means adapted to measure the total volume of said liquids discharged from said vessel.

6. Apparatus as recited in claim 5 in which said heavier liquid retaining and releasing means includes a barrier arranged in the bottom of said vessel adapted to prevent heavier liquid in the bottom of said vessel on one side of said barrier from communicating with said bottom discharge; and
   an L-shaped tube fluidly communicating at one end with said liquid retained on said one side of said barrier and at the other end with said bottom discharge, said other end of said tube extending upwardly relative to said one end thereof and terminating below the upper edge of said barrier whereby the energy of liquids discharging from said vessel acts on the other end of said tube to prevent release of liquid retained by said barrier.

7. Apparatus as recited in claim 6 in which said heavier liquid is water and said lighter liquid is oil.

8. A method for measuring the heavier liquid component of a flow stream mixture of heavier and lighter separable liquid components comprising the steps of:
   introducing said flow stream into a vessel, at least some of said heavier liquid separating from said flow stream in said vessel as said vessel fills;
   syphoning the contents of said vessel by means of a syphon attached to said vessel when the head of said liquids in said vessel reaches a selected height which counterbalances the head of the heavier liquid which fills the shorter leg of the syphon while retaining an amount of heavier liquid in said vessel sufficient to insure that the shorter leg of said syphon is free of lighter liquid following discharge of said vessel; and
   counting each syphoning of said vessel whereby the number of syphonings, the size of said vessel, and the head of said separated heavier liquid when said syphoning begins permit determination of the amount of heavier liquid in said flow stream.

9. A method as recited in claim 8 including drawing off lighter liquids that separate in said vessel as said vessel fills.

10. A method as recited in claim 9 including measuring the total volume of said flow stream.

11. Apparatus for determining the amount of water in a flow stream containing both water and oil comprising a vessel having a flow stream inlet for said water and oil and a bottom discharge for all of the water in said flow stream;
   a syphon attached to said bottom discharge, the intermediate elevation of which is at a selected height relative to a selected head of the liquids in said vessel at which it is desired to discharge said vessel through said syphon;
   means within said vessel adapted to retain an amount of free water separable from the flow stream liquids each time said vessel fills to fill the shorter leg of said syphon and adapted to release said retained water to flush the shorter leg of said syphon and leave it oil-free following discharge of said liquids from said vessel;
   said selected head of the liquids being that sufficient to force water up the shorter leg of said syphon to the intermediate elevation between both legs of said syphon to discharge through said syphon tube the contents of said vessel except said retained water; and
   a counter arranged on the longer leg of said syphon adapted to count each syphoning of said vessel whereby the number of syphonings, the size of said vessel, and the head of said separated water when said syphoning begins permit determination of the amount of water in said flow stream.

12. A method for measuring the water component of a flow stream mixture of water and oil comprising the steps of introducing said flow stream into a vessel, at least some of said water separating from said flow stream in said vessel as said vessel fills;

syphoning the contents of said vessel by means of a syphon attached to said vessel when the head of said liquids in said vessel reaches a selected height which counterbalances the head of water which fills the shorter leg of the syphon while retaining an amount of water in said vessel sufficient to insure that the shorter leg of said syphon is oil-free following discharge of said vessel; and counting each syphoning of said vessel whereby the number of syphonings, the size of said vessel, and head of said separated water when said syphoning begins permit determination of the amount of water in said flow stream.

References Cited by the Examiner

UNITED STATES PATENTS

| | | | |
|---|---|---|---|
| 1,795,006 | 3/1931 | Boiney | 137—132 X |
| 1,896,429 | 2/1933 | Sparklin | 73—222 |
| 2,229,122 | 1/1941 | Pershing | 137—132 X |
| 2,630,010 | 3/1953 | Miles | 73—226 |
| 3,009,359 | 11/1961 | Hubby | 73—53 X |

LOUIS R. PRINCE, *Primary Examiner.*

DAVID SCHONBERG, RICHARD QUEISSER,
*Examiners.*